United States Patent

Savoji

[11] Patent Number: 6,158,938
[45] Date of Patent: Dec. 12, 2000

[54] ANTI-CROSS THREADING FASTENER

[75] Inventor: Seina Savoji, Hoffman Estates, Ill.

[73] Assignee: Illinois Tool Works Inc, Glenview, Ill.

[21] Appl. No.: 09/038,462

[22] Filed: Mar. 11, 1998

[51] Int. Cl.[7] ............................. F16B 25/00; F16B 35/04
[52] U.S. Cl. ........................... 411/386; 411/417; 411/426
[58] Field of Search .................................. 411/386, 411, 411/417, 424, 412, 418, 426

[56] References Cited

U.S. PATENT DOCUMENTS

| 1,827,615 | 10/1931 | Rosenberg . | |
|---|---|---|---|
| 3,094,894 | 6/1963 | Broberg | 411/417 |
| 3,208,328 | 9/1965 | Myers . | |
| 3,352,190 | 11/1967 | Carlson | 411/424 |
| 3,828,604 | 8/1974 | Shelton . | |
| 4,069,730 | 1/1978 | Gutshall | 411/417 |
| 4,157,674 | 6/1979 | Carlson et al. . | |
| 4,261,402 | 4/1981 | Stanaitis | 411/486 |
| 4,334,815 | 6/1982 | Knohl . | |
| 4,637,764 | 1/1987 | Imai | 411/386 |
| 4,952,110 | 8/1990 | Avgoustis et al. . | |
| 4,981,406 | 1/1991 | Weiss et al. . | |
| 5,064,327 | 11/1991 | Hughes . | |
| 5,073,073 | 12/1991 | Kazino et al. . | |
| 5,141,376 | 8/1992 | Williams | 411/411 |
| 5,209,622 | 5/1993 | Kazino et al. . | |
| 5,234,301 | 8/1993 | Grossberndt | 411/386 |
| 5,609,455 | 3/1997 | McKewan . | |
| 5,836,731 | 11/1998 | Goodwin | 411/411 |

FOREIGN PATENT DOCUMENTS

| 182613 | 7/1989 | Japan . | |
|---|---|---|---|
| 57415 | 7/1993 | Japan | 411/386 |
| 21412 | of 1900 | United Kingdom . | |
| WO9704241 | 2/1997 | WIPO . | |

OTHER PUBLICATIONS

Camcar Textron,"Acupoint™ Anti–Cross–Threading Feature", known by Applicant on or about Aug. 1997, pp. 1 and 2.

Primary Examiner—Flemming Saether

[57] ABSTRACT

An anti-cross threading fastener having a threaded shaft portion with a major diameter and a minor diameter, a leading end shaft portion devoid of screw threads and having a diameter less than the major diameter of the threaded shaft portion. The leading end shaft portion also includes a tip having an at least partially substantially curved surface, and a groove disposed about the shaft portion between the tip portion and the threaded shaft portion. A cylindrical shaft portion may be disposed between the tip portion and the groove. A portion of the threaded shaft portion tapers narrowingly toward the tip portion thereof, and the screw threads of the tapered threaded shaft portion have a flank angle greater than a flank angle of the screw threads of a non-tapered threaded shaft portion. The tapered screw threads may be formed of spaced apart lobes.

18 Claims, 2 Drawing Sheets

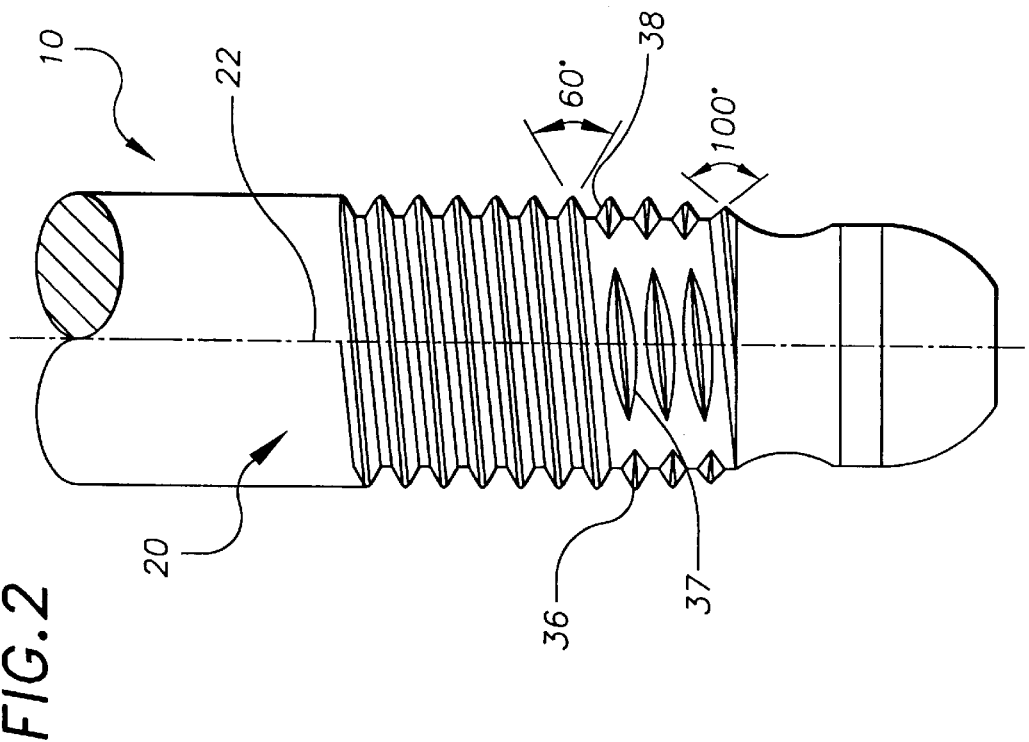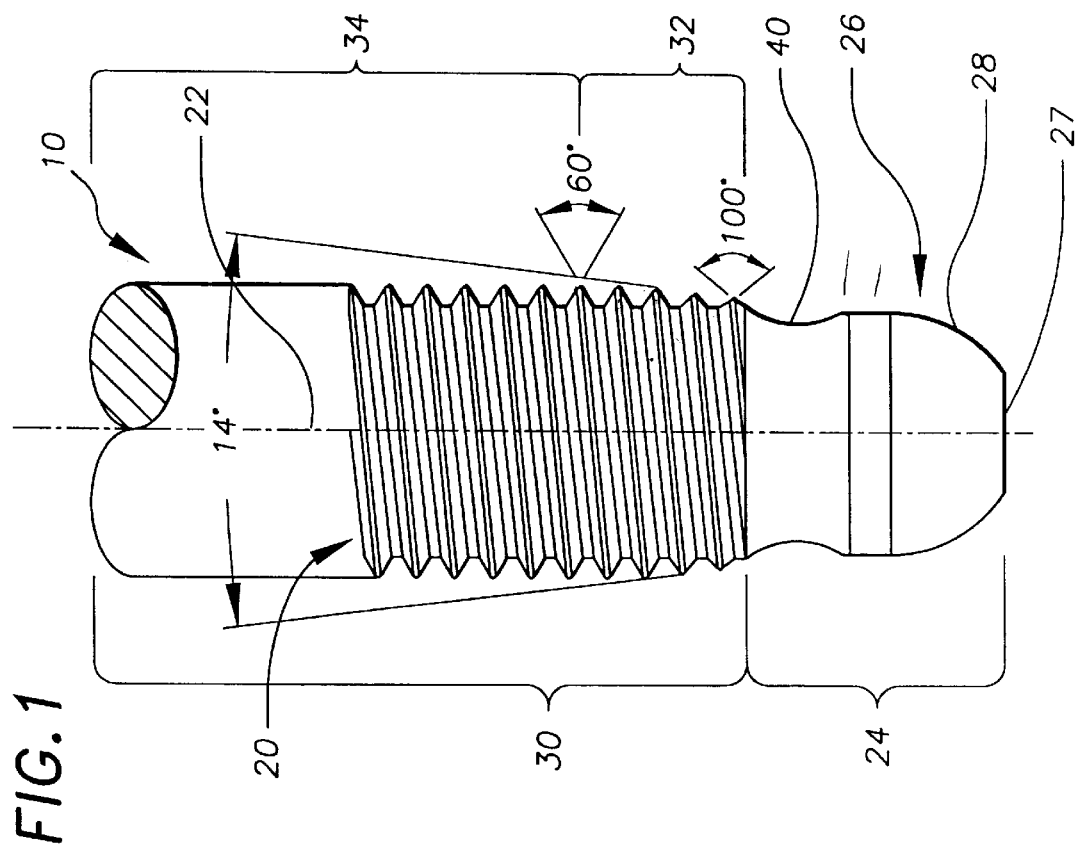

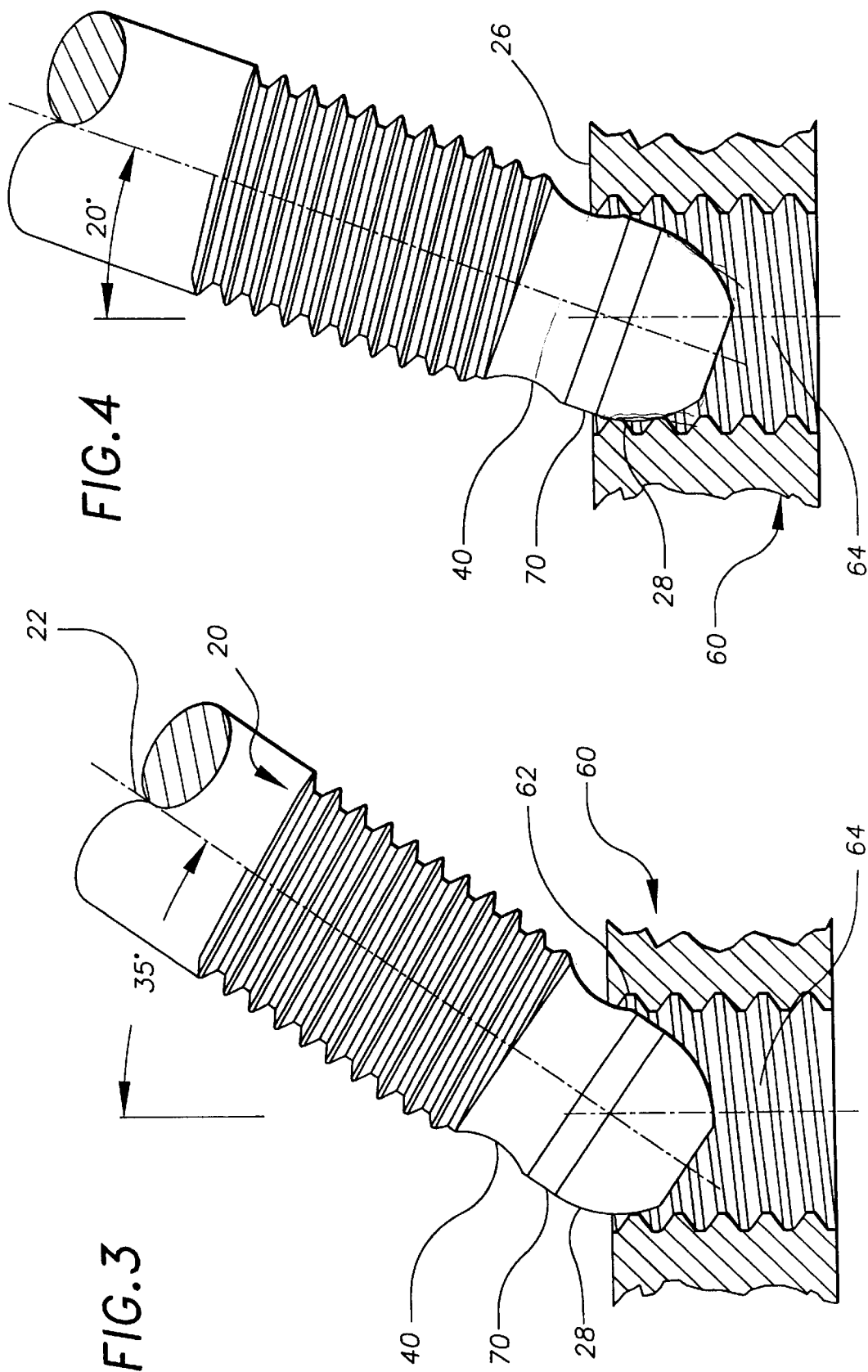

US 6,158,938

ANTI-CROSS THREADING FASTENER

BACKGROUND OF THE INVENTION

The invention relates generally to threaded fasteners, and more particularly to improved anti-cross threading fasteners.

Threaded fasteners of the type including a helically threaded shaft portion are known generally and used widely. These include various threaded shaft members about which a nut or other member having a complementary threaded bore is installable. The threaded shaft members are formed often as bolts with a tool engagable, or wrenching end, to which a torque is applied for installation, but more generally may include any threaded shank protruding from an article or machine.

It is also known that threaded fasteners have a tendency to cross-thread during assembly. Cross-threading occurs generally due to angular and axial misalignment between the threaded members during assembly, and is particularly troublesome for unskilled laborers and automated assembly operations, resulting in reduced productivity and damaged components, which are generally not reusable. The problems associated with crossthreading have been recognized by others, and efforts have been made to eliminate or at least reduce the occurrence thereof.

U.S. Pat. No. 3,828,604 issued Aug. 14, 1974, entitled "Method and Apparatus for Forming Tips of Screws", and assigned commonly herewith, for example, discloses a method for making threaded fasteners having a curved tip portion which facilitates assembly thereof in a complementarily threaded bore.

WIPO International Publication No. WO 97/04241 entitled "Anti-Cross Threading Fastener", published on Feb. 6, 1997 discloses a fastener with two or more relatively narrow diameter and curved transitional threads, which may reduce cross-threading when the angular and axial misalignments are not excessive. In Publication No. WO 97/04241, however, the threaded shaft portion proximate the tip end thereof limits the angular misalignment for which the curved threads compensate. In other embodiments disclosed in Publication No. WO 97/04241, a non-threaded fastener tip end, or dog point, portion having a reduced diameter similarly limits the angular misalignment for which the curved threads compensate.

The present invention is drawn toward advancements in the art of threaded fasteners generally, and more particularly to novel improvements in anti-cross threading fasteners including bolts, screws and other threaded shaft members.

It is an object of the invention to provide novel anti-cross threading fasteners that overcome problems in the prior art, and that are economical to manufacture.

It is another object of the invention to provide novel anti-cross threading fasteners that are easy to assemble, and that are relatively consistently and properly installable, and that are installable under angular and axial misalignment conditions for which prior art anti-cross threading fasteners do not compensate.

It is a further object of the invention to provide novel anti-cross threading fasteners useable in applications susceptible to cross-threading including assembly by unskilled laborers and especially automated fastener assembly operations.

It is a more particular object of the invention to provide novel anti-cross threading fasteners having a threaded shaft portion with a major diameter and a minor diameter, and a leading end shaft portion devoid of screw threads and having a diameter less than the major diameter of the threaded shaft portion. The leading end shaft portion including a tip portion having an at least partially substantially curved surface, and a groove disposed about the shaft between the tip portion and the threaded shaft portion.

It is a related object of the invention to provide novel anti-cross threading fasteners of the type discussed more particularly above having additionally a cylindrical shaft portion between the tip portion and the groove thereof.

It is another more particular object of the invention to provide novel anti-cross threading fasteners having a threaded shaft portion and a portion thereof tapered narrowingly toward a tip portion of the shaft. The screw threads of the tapered threaded shaft portion having a flank angle greater than a flank angle of the screw threads of a nontapered, or remaining, threaded shaft portion.

It is yet another more particular object of the invention to provide novel anti-cross threading fasteners having a threaded shaft portion, and a portion thereof tapering narrowingly toward a tip portion of the shaft. At least some of the screw threads on the tapered threaded shaft portion formed of spaced apart lobes.

It is still another object of the invention to provide novel anti-cross threading fasteners having various combinations of the configurations discussed above.

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

BRIEF DESCRIPTION OF THE DRAWINGS

FIG. 1 is a partial side view of a threaded fastener according to an exemplary embodiment of the invention.

FIG. 2 is a partial side view of a threaded fastener according to an alternative exemplary embodiment of the invention.

FIG. 3 is a partial sectional view of a threaded fastener according to the present invention misaligned during assembly in a complementarily threaded bore.

FIG. 4 is another partial sectional view of a threaded fastener according to the present invention misaligned during assembly in a complementarily threaded bore.

DETAILED DESCRIPTION OF THE INVENTION

FIGS. 1–4 illustrate an anti-cross threading fastener 10 according to the present invention, which may be the threaded shaft portion of a bolt having a wrenching end, not shown, or more generally any threaded shaft member protruding from an article or machine and threadably engagable in the bore of a nut or other complementarily threaded member.

The anti-cross threading fastener 10 includes generally a shaft 20 having an axial dimension 22 and a leading end portion 24 with a tip portion 26. Screw threads 30 are formed on a portion of the shaft portion 20, wherein the threaded shaft portion 30 has a major diameter and a minor diameter. The minor diameter of the threaded shaft portion 32 may be the same as or less than a root diameter of the shaft portion 34. In one embodiment, the leading end portion 24 of the shaft portion 20 is devoid of screw threads and has a diameter less than the major diameter of the threaded shaft portion 30. And in another embodiment, the leading end portion 24 of the shaft portion devoid of screw threads has a diameter less than the minor diameter of the threaded portion of member 60.

In one embodiment, the tip portion 26 of the shaft portion 20 has an at least partially substantially curved surface 28, which may include a relatively flat end portion 27 as shown in the exemplary embodiment. The substantially curved surface 28 may be a substantially spherical or ellipsoidal or paraboloidal or other irregular curved surface with or without the relatively flat end portion 27. The substantially curved surface 28 facilitates disposing the leading end portion 24 of the shaft portion 20 into the nut or other complementarily threaded member when there is axial and angular misalignment therebetween, and also facilitates aligning the shaft portion 20 with the nut or other complementarily threaded member during installation thereof as discussed further below.

A substantially annular groove 40 is disposed about the shaft portion 20 between the at least partially substantially curved surface 28 of the tip portion 26 and the threaded shaft portion 30. FIG. 3 illustrates the anti-cross threading fastener 10 being disposed in the nut or other complementarily threaded member 60 with a relatively large angular misalignment of approximately 35 degrees therebetween. The substantially annular groove 40 accommodates an annular edge portion 62 of the nut 60, thereby facilitating the initial positioning and retaining of the leading portion 24 of the fastener into the bore 64 of the nut 60 at greater angular misalignments than are possible in the absence of the recess 40. FIGS. 3 and 4 illustrate the at least partially substantially curved surface 28 of the tip portion 26 permitting and facilitating subsequent angular orientation, or pivoting, of the shaft portion axis 22 into angular and axial alignment with an axis of the nut 60. FIG. 4 also illustrates the maximum angular misalignment between the shaft axis 22 and the nut 60, which is approximately 20 degrees in the exemplary embodiment, that is compensable by the anti-cross threading fastener 10 in the absence of the substantially annular recess 40.

FIGS. 1–4 also illustrate a cylindrical shaft portion 70 disposed between the at least partially substantially curved surface 28 of the tip portion 26 and the substantially annular groove 40 disposed about the shaft portion 20. After the shaft portion 20 is substantially aligned axially and angularly with the bore 64 of the nut, the cylindrical shaft portion 70 maintains substantial axial and angular alignment of the shaft portion 20 in the bore 64 of the nut 60 upon insertion of the cylindrical shaft portion 70 into the bore 64.

In one embodiment, the cylindrical shaft portion 70 has an axial dimension corresponding to approximately 1 pitch of the screw threads, and in other embodiments the axial dimension thereof may be somewhat more or less. The axial dimension of the cylindrical shaft portion 70, however, must be sufficiently long to maintain substantial alignment of the shaft portion 20 after insertion of the cylindrical portion 70 thereof into the nut bore 64, yet must not be so long as to interfere with the initial pivotal alignment of a misaligned shaft portion 20 as discussed above in connection with FIGS. 3 and 4.

FIGS. 1–4 also illustrate a portion 32 of the threaded shaft portion 30 tapering narrowingly toward the tip portion 26 of the shaft portion 20. In one embodiment, the tapered threaded shaft portion 32 has an axial dimension between approximately 3 and approximately 4 pitches of the screw thread. The tapered threaded shaft portion 32 facilitates alignment of the screw threads 30 with the threaded bore 64 of the nut 60, compensating for modest angular misalignment between the shaft portion 20 and the nut 60 upon insertion of the shaft portion 20 therein and promoting proper thread engagement therebetween. The angle of the taper is in a range between approximately 10 degrees and approximately 18 degrees, and in the exemplary embodiment angle of the taper is approximately 14 degrees.

FIG. 2 illustrates at least some of the screw threads on the tapered threaded shaft portion 32 formed of spaced apart lobes, several of which are identified by numerals 36, 37 and 38, and which are preferably spaced substantially evenly about the circumference of the shaft portion 20. The lobed threaded shaft portion compensates for even greater degrees of misalignment between the shaft portion 20 and the nut 60 after insertion of the shaft portion therein and promotes proper thread engagement therebetween than would be compensable without the lobed threads.

FIGS. 1 and 2 illustrate the screw threads of the tapered threaded shaft portion 32 having a flank angle greater than a flank angle of the screw threads of the remaining non-tapered threaded shaft portion 34. The flank angle of the tapered threaded shaft portion 32 increases toward the tip portion 26 of the shaft portion 20. In the exemplary embodiment, the flank angle of the non-tapered threaded shaft portion 34 is approximately 60 degrees, and as the diameter of the threaded shaft portion 32 decreases toward the end 27 the flank angle thereof increases to approximately 100 degrees. The increasing flank angle of the tapered threaded shaft portion 32 also facilitates alignment of the screw threads 30 with the threaded bore 64 of the nut 60, further compensating for modest angular misalignment between the shaft portion 20 and the nut 60 after insertion of the shaft portion 20 therein and further promoting proper thread engagement therebetween, thereby further increasing the effectiveness with which the threaded shaft portion 30 is properly threadably engaged with the threaded bore 64 of the nut 60.

While the foregoing written description of the invention enables one of ordinary skill in the art to make and use what is at present considered to be the best mode of the invention, it will be appreciated and understood by those of ordinary skill the existence of variations, combinations, modifications and equivalents within the spirit and scope of the specific exemplary embodiments disclosed herein. The present invention is therefore to be limited not by the specific exemplary embodiments disclosed herein but by all embodiments within the scope of the appended claims.

What is claimed is:

1. An anti-cross threading fastener comprising:

a shaft portion having an axial dimension and a distal end;

first threads formed on a portion of the shaft portion, the first threads having a major diameter, a minor diameter, and a first flank angle; and second threads formed on a portion of the shaft portion proximate the distal end, the second threads having two generally planar flanks which converge to form a generally pointed standard machine thread crest, and the second threads having a major diameter less than the major diameter of the first threads, a minor diameter equal to the minor diameter of the first threads, and a second flank angle greater than the flank angle of the first threads;

wherein a taper angle is defined by a crest of a first thread and a crest of an adjacent second thread, and the taper angle is approximately 14 degrees.

2. The fastener of claim 1 wherein the first flank angle is approximately 60 degrees and the second flank angle is approximately 100 degrees.

3. The fastener of claim 1 wherein there are between approximately 3 and 4 pitches of the second threads.

4. The fastener of claim 1 wherein the first flank angle increases to the second flank angle.

5. The fastener of claim 1 wherein the distal end has a tip devoid of threads and a diameter less than the minor diameter of the first and second threads.

6. The fastener of claim 5 wherein the tip has a substantially curved surface.

7. The fastener of claim 5 wherein the tip has an annular groove with an inner diameter lees than the minor diameter of the first and second threads.

8. The fastener of claim 5 wherein the tip has a cylindrical section having a diameter less than the minor diameter of the first and second threads and an axial dimension equal to approximately 1 pitch of the first and second threads.

9. The fastener of claim 5 wherein the tip is comprised of an end having a substantially curved surface, a cylindrical section adjacent the end and having a diameter less than the minor diameter of the first and second threads, an annular groove disposed between the cylindrical section and the second threads, the annular groove having an inner diameter less than the diameter of the cylindrical section.

10. An anti-cross threading fastener comprising;

a shaft portion having an axial dimension and a distal end;

first threads formed on a portion of the shaft portion, the first threads having a major diameter, a minor diameter, and a first flank angle; and second discontinuous threads formed on a portion of the shaft portion proximate the distal end, the second threads having two generally planar flanks which converge to form a generally pointed standard machine thread crest, and the second discontinuous threads having a major diameter less than the major diameter of the first threads, a minor diameter equal to the minor diameter if the first threads, and a second flank angle greater than the flank angle of the first threads;

wherein a taper angle is defined by a crest of a first thread and a crest of an adjacent second discontinuous thread, and the taper angle is approximately 14 degrees.

11. The fastener of claim 10 wherein the first flank angle is approximately 60 degrees and the second flank angle is approximately 100 degrees.

12. The fastener of claim 10 wherein there are between approximately 3 and 4 pitches of the second discontinuous threads.

13. The fastener of claim 10 wherein the first flank angle increases to the second flank angle.

14. The fastener of claim 10 wherein the distal end has a tip devoid of threads and a diameter less than the minor diameter of the first and second threads.

15. The fastener of claim 14 wherein the tip has a substantially curved surface.

16. The fastener of claim 14 wherein the tip has an annular groove with an inner diameter less than the minor diameter of the first and second threads.

17. The fastener of claim 14 wherein the tip has a cylindrical section having a diameter less than the minor diameter of the first and second threads and an axial dimension equal to approximately 1 pitch of the first threads and second discontinuous threads 18. The fastener of claim 14 wherein the tip is comprised of an end having a substantially curved surface, a cylindrical section adjacent the end and having a diameter less than the minor diameter of the first and second threads an annular groove disposed between the cylindrical section and the second threads, the annular groove having an inner diameter less than the diameter of the cylindrical section.

* * * * *